United States Patent [19]

Wells et al.

[11] 4,054,378

[45] Oct. 18, 1977

[54] SELECTOR INTERLOCK FOR MICROFICHE CARTRIDGE

[75] Inventors: Thomas R. Wells, Des Plaines, Ill.; Theodore E. Dahlen, West Bend, Wis.

[73] Assignee: Bell & Howell Company, Chicago, Ill.

[21] Appl. No.: 618,996

[22] Filed: Oct. 2, 1975

[51] Int. Cl.² .......................................... G03B 23/08
[52] U.S. Cl. ................................................ 353/27 R
[58] Field of Search .......................... 353/27 R, 27 A

[56] References Cited

U.S. PATENT DOCUMENTS

| 3,528,735 | 9/1970 | Bluitt et al. | 353/27 A |
| 3,720,464 | 3/1973 | Ditsheid | 353/27 R |
| 3,743,400 | 7/1973 | Haning et al. | 353/26 A |
| 3,797,925 | 3/1974 | Smitzer | 353/27 R |

Primary Examiner—Steven L. Stephan
Attorney, Agent, or Firm—Robert A. Walsh

[57] ABSTRACT

A library file of microfiche film comprises a plurality of spaced parallel film stored inside a cartridge. In a microfiche reader, a reciprocally moving extractor moves into and out of the cartridge to extract and return microfiche. An elevator control means selectively raises or lowers the cartridge relatively to the extractor, thereby selecting a particular microfiche. An interlock mechanism actuated by the extractor and selectively connected to the elevator control means prevents the elevator from moving after a microfiche is extracted and before it is returned to the cartridge.

7 Claims, 6 Drawing Figures

SELECTOR INTERLOCK FOR MICROFICHE CARTRIDGE

This invention relates to microfiche readers and more particularly to means for selecting one of many microfiche which are pre-loaded in cartridges.

Microfiche film is a known form of graphic data presentation wherein a number of pages are photographically reproduced on a single "card" or microfiche film (such as a 3 × 5 to 4 × 6 card, for example). Any suitable number (up to, say, a thousand or so) of pages may be photographically formed in any orthogonal array on a single microfiche "card" of photographic film. The microfiche film may then be placed in an optical reader and moved until a selected image is in an optical projection path leading to a display screen.

It would be uneconomical to have a microfiche reader system for a single microfiche card. The user is more likely to have an entire library file including many microfiche which must be kept in a specific order for quick recall. Therefore, it should be apparent that microfiche must be fileld and stored, removed from storage, inserted into the reader, be mechanically manipulated, and then removed from the reader and refiled. Each microfiche must be found in the library file with little or almost no search, and then returned to exactly the same spot in the library file, once again ready for future reference.

A cartridge type mechanical microfiche reader may be designed to find and extract the desired microfiche and, after use, to return it to its proper library file location within the cartridge. In greater detail, the preferred reader includes an elevator mechanism which may receive a cartridge and then raise or lower it to a selected level. At that level, an extractor removes the microfiche stored there. Later the extractor returns the extracted microfiche to the same level. Accordingly, there is a need for an elevator which may raise or lower the cartridge to a selected level with extreme accuracy.

Therefore, an object of the invention is to provide new and improved microfiche readers and more particularly to provide an elevator mechanism for such readers.

Another object of the invention is to provide microfiche readers having elevators, with suitable interlocks, so that the microfiche positions cannot become "lost" in a library file as a result of reader operation. In greater detail, an object is to enable a library file of microfiche to be loaded into cartridges which may then be inserted into the microfiche reader elevator for selection of a single microfiche from the file. Here an object is to provide a mechanical interlock which prevents the cartridge from being moved after a microfiche is extracted and before it is replaced.

Yet another object of the invention is to provide an elevator having a simple and obvious operation so that the reader may be used by people who have no special training in its use. Here an object is to enable, say a casual patron of a public library, for example, to use the reader with only the simplest of instructions.

In keeping with an aspect of the invention, these and other objects are accomplished by providing a microfiche reader having an elevator mechanism including mechanically interacting parts which interlock when a microfiche is out of the library file. After a cartridge containing a library file has been inserted into an elevator, it is raised to and locked in a position where a selected microfiche is adjacent a reciprocating extractor mechanism. Then, the extractor withdraws the microfiche from the cartridge and passes it across the microfiche reader where a selected image is projected onto a screen. Upon movement of the extractor from the withdrawl position, the elevator is locked in position. Thereafter, the microfiche is returned into the cartridge. Only then may the elevator be unlocked and moved from its locked position.

The nature of a preferred embodiment of the invention may be understood best by a study of the attached drawing wherein.

Figure 1:
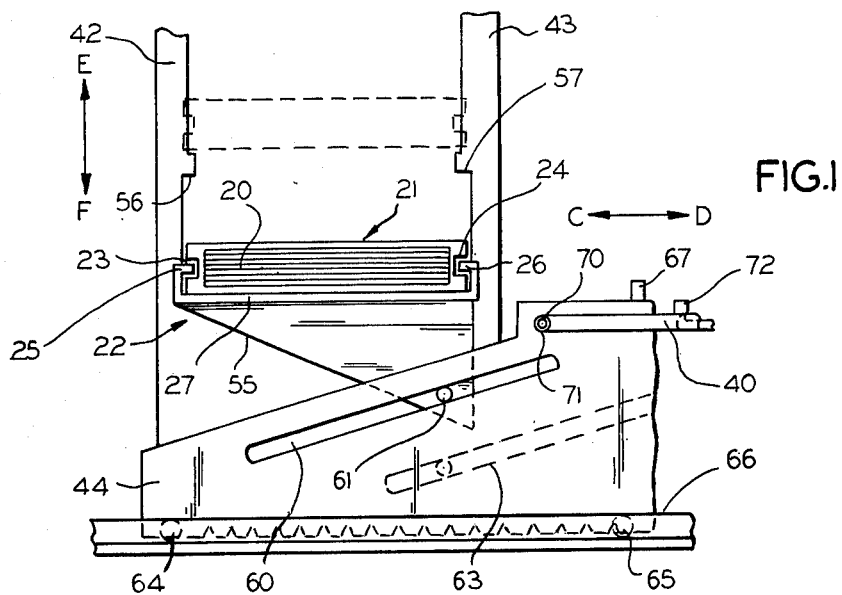
FIG. 1 is a schematic front view of an elevator mechanism for selectively raising a cartridge containing a library file to a microfiche selecting position.

In reference to FIG. 1, a library file 20 of microfiche is loaded into a cartridge 21 which may then be selected and inserted into an elevator mechanism 22 in a microfiche reader. A number of mechanical interlocking means are provided on or in connection with the cartridge to prevent the reader from being operated incorrectly, misused, damaged, or cause loss of a microfiche while it is extracted from the cartridge.

Figure 2:
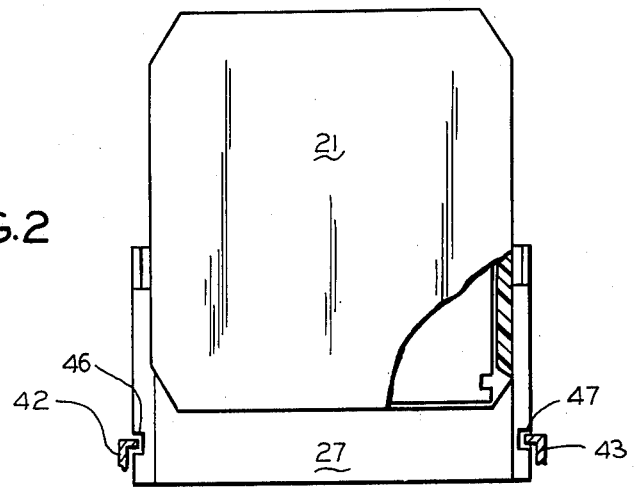
FIG. 2 is a plan view of the cartridge and an elevator base plate.
Figure 5:
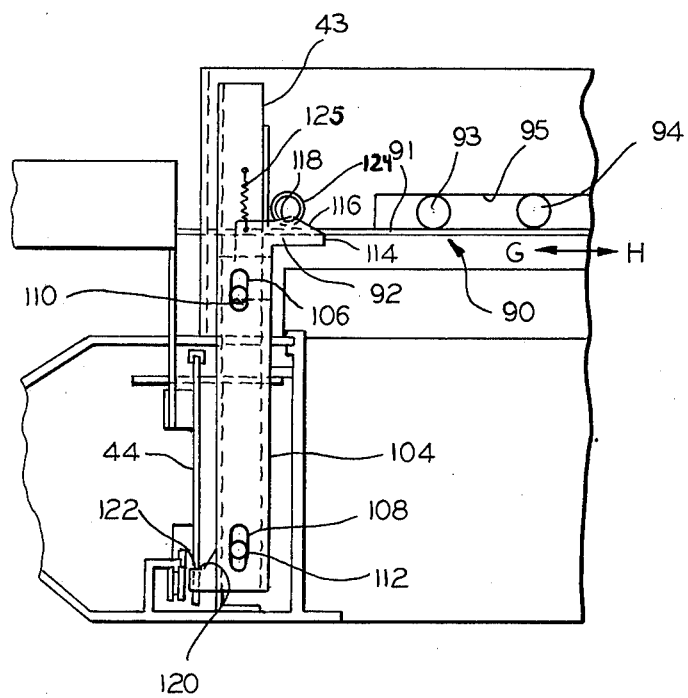
FIG. 5 is a cross sectional view taken along line 5—5 of FIG. 4.

Briefly, the cartridge 21 containing the library file 20 may be inserted into the elevator mechanism 22 which thereafter raises the cartridge to the level of a selected microfiche. More particularly, the cartridge 21 has grooves 23, 24 formed in opposite sides to receive tabs 25, 26 on an elevator base place mechanism 27 (FIG. 2). After cartridge 21 is slid into place between the tabs 25, 26 it fits snuggly against the front of the elevator mechanism. Then, the elevator is operated until a selected microfiche is brought adjacent an extractor mechanism 90 (FIG. 5). When the extractor withdraws the microfiche from the cartridge, the elevator is locked in position. After a selected image is projected onto a screen, the microfiche is returned into the cartridge, and the elevator is unlocked.

A number of microfiche file 20 (FIG. 1) are secured in a spaced parallel relationship inside a cartridge 21. Shelves (not shown) are formed inside the cartridge to hold the microfiche in place, with a planar orientation which is horizontal in this configuration. It is irrelevant how the microfiche are put into the cartridge. They may be packaged during a manufacturing process. Or, they may be inserted by the user, either by hand or by placing a microfiche in an automatic reader which inserts it into the cartridge.

The microfiche 20 are locked into the cartridge 21 while the cartridge is out of the reader and before the elevator is raised to a reading position. That is, a plate 30 (FIG. 3) having a detent 31, is pivotally mounted on the cartridge at point 32 and another point (not shown) diametrically opposed on the bottom of the cartridge. A spring (not shown) biases the plate 30 in direction A whereby detent 31 enters the cartridge 21 and fits into a notch formed on each microfiche to hold it in position and prevent its removal from the cartridge. To load and unload the cartridge, the tab 33 is pressed in direction B. Plate 30 pivots at point 32 to move detent 31 out of the cartridge 21. The microfiche may then be inserted into or removed from the cartridge. When the tab 33 is released and plate 30 again pivots on point 32, detent 31 moves back into the cartridge, and the microfiche are again locked into the cartridge.

Alternate means may be provided for locking the fiche 20 into the cartridge 21. For example, in a second embodiment, in place of plate 30 and detent 31 (FIG. 3), one interior side wall of cartridge 21 is provided with a vertically extending rib or bump which is molded directly into the wall structure. The microfiche 20 includes a detent or cut-out portion along one edge which is adapted to engage the bump when the fiche is inserted in the cartridge. The fiche is inherently rigid enough to prevent accidental removal of the fiche from the cartridge, yet flexible enough to permit removal of the fiche under the influence of extractor arms 92 (FIG. 5).

Figure 3:
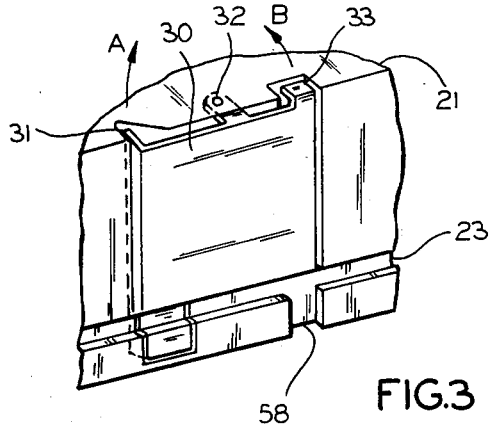
FIG. 3 is a perspective view of one corner of the cartridge, showing a mechanism for normally locking the microfiche in place in the cartridge.

Yet another alternate means for preventing accidental removal of the fiche from the cartridge includes replacing plate 30 and detent 31 (FIG. 3) with a set of comb spring fingers extending vertically and adapted to enter into the slot of the cartridge in which detent 31 is shown entering in FIG. 3. The spring fingers are biased inward and engage detent or cut-out portions in the edge of each fiche.

The elevator 22 (FIG. 1) is arranged to raise the cartridge 21 by a precisely selected distance to thereby position a selected microfiche inside the cartridge adjacent extractor hooks 82 (FIG. 5). The elevator position is selected and controlled by a lever arm 40 which slides back and forth in directions C, D. Alphanumerical characters may be provided adjacent the arm 40 in order to identify the height of the elevator and, therefore, the selected microfiche.

More specifically, the elevator mechanism comprises the elevator base plate 27, an elevator shaft 41 (FIGS. 4, 5), a pair of oppositely disposed guides 42, 43, and a control plate 44. The elevator base plate 27 (FIG. 2) includes a pair of opposed vertically extending slots 46, 47 which receive the edges of vertical guides 42, 43, thereby enabling an elevator motion which is perpendicular to the planar orientation of the microfiche, which motion is vertical in the disclosed configuration. The elevator shaft 41 (FIGS. 4, 5) includes elongated slots 50 and 50A and fits behind the edge guide 43. Holding pins or rollers 51 and 51A fit through the slots 50 and 50A and turn into threaded holes in the edge guide 43 where they stabilize the vertical shaft position. The bottom of the elevator shaft is attached to plate 55 (FIG. 1) which is integral with and dependent from the elevator base plate 27. The elevator shaft is vertically stabilized by the edge guides 42, 43 riding in grooves 46, 47. Accordingly, the elevator base plate 27 and shaft 41 assembly can slide up and down on the edge guides 42, 43 without binding.

Figure 6:
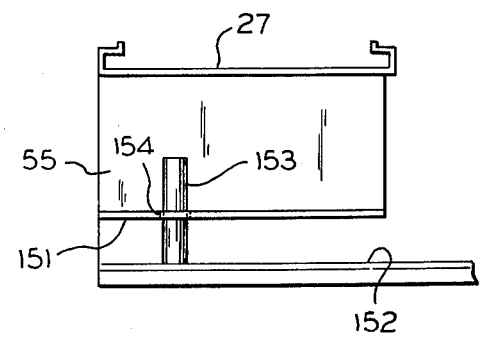
FIG. 6 is a partial view of an alternate embodiment of a stabilizing structure for the elevator mechanism of the present invention.

FIG. 6 illustrates an alternate apparatus for stabilizing the vertical movement of the elevator base plate 27. In this embodiment, plate 55 is rectangular in shape and includes a horizontally extending portion 151 at the bottom thereof. Attached to the base 152 of the reader is a vertically disposed stabilizer guide pin 153 which extends upward through an aperture 154 in portion 151 of plate 55. The aperture 154 is only slightly larger than the diameter of pin 153, such that there is little play between the two. As elevator base plate 27 moves vertically under the influence control plate 44, lateral movement is eliminated as portion 151 rides up and down on guide pin 153.

In one embodiment of the present invention, means are provided for interlocking the cartridge into the reader mechanism to preclude its removal therefrom after a microfiche is removed from the cartridge. At the same time, the microfiche in the cartridge are also interlocked so that they cannot be inadvertently removed except when the cartridge is in place in the reader. More particularly, the vertical space below edge guide shoulders 56, 57 provides clearance for an insertion of cartridge 21 into the elevator mechanism (FIG. 1). The edge guides 42, 43 slide in slots 46, 47 without contacting the cartridge 21 until shoulder 57 enters slot 58 (FIG. 3) on the cartridge. As the elevator base plate 27 slides up the edge guides 42, 43, it engages the shoulders which controls the interlock plate 30 (FIG. 3).

The elevator continues rising after it reaches and passes the shoulders 56, 57. As the shoulder passes over plate 30 (FIG. 3) it pivots in direction B to lift the detent 31 out of the notches in the microfiche in the cartridge. The reader mechanism may now extract the microfiche from the cartridge, but the cartridge cannot be removed from the reader. This way, it is impossible to inadvertently remove a cartridge from the reader unless all fiche have been returned to the cartridge, thus maintaining the integrity of the file.

The elevating mechanism comprises vertically orientedand horizontally sliding plate 44 having an inclined slot 60 formed therein. Dependent from and integral with the elevator base plate 27 is the plate 55 having a pin 61 fixed perpendicularly thereto. The pin rides in slot 60. Therefore, as plate 44 moves back and forth horizontally in directions C, D, the pin 61 slides vertically along the inclined slot 60, to move the elevator 26 up and down in directions E, F (e.g., dotted lines 63 (FIG. 1) show how the inclined slot has moved in direction D to lower pin 61 in direction F).

Figure 4:
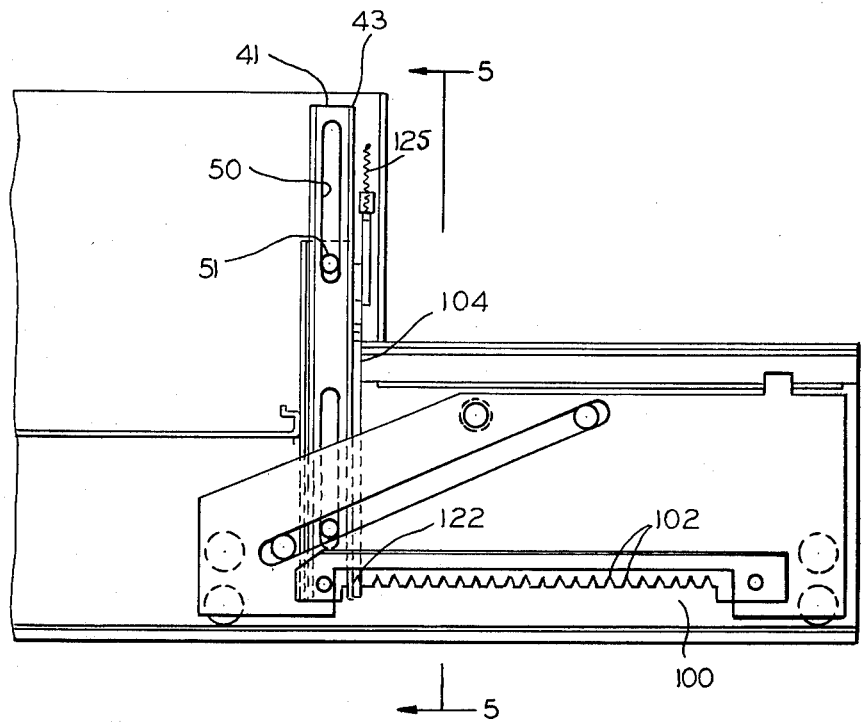
FIG. 4 is a front elevation view of an elevator mechanism particularly illustrating the elevator interlock structure.

The plate 44 has lower edge wheels 64, 65 which ride on a rail 66 (FIGS. 1, 4). An upper guide tab 67 fits into a slot on a plate 68 (FIG. 4) in the reader housing. The control lever 40 is pivotally attached at 70 to plate 44. A spring 71 urges lever 40 to a normally raised position, where tab 72 on lever 40 projects upwardly through another slot 73, also formed in plate 68. Integral with lever 40 is a detent 74 which fits into any one of many holes longitudinally disposed parallel to the slot 73. Thus, the tab 72 may be pushed downwardly, against the bias of spring 70, and slid in directions C, D to a selected spot identified by an alphanumerical scale 76 (FIG. 4). Then, the tab 72 may be released, whereupon clock spring 71 forces detent 74 into an adjoining hole. The mechanical dimensions are such that a single microfiche, identified by the alphanumerical scale 76, is opposite an extractor arm 892 (FIG. 5) whenever detent 74 is in a selected hole. This way, any microfiche may be selected and extracted from the cartridge.

Means are provided for preventing movement of the elevator while a microfiche has been extracted from a cartridge. More specifically, the control plate 44 includes a cut-out portion 100 along the lower edge thereof, and a series of V-grooves 102 formed along the upper border of the cut-out portion. A detent operating shaft 104 (FIG. 4) is mounted to guide 43 for limited vertical movement with respect thereto. In particular, shaft 104 includes a pair of elongated grooves 106, 108. A pair of pin rollers 110, 112 are fixed to guide 43, and shaft 104 is mounted adjacent guide 43 by extending rollers 110, 112 through grooves 106, 108. Shaft 104 is then free to move vertically for a limited distance.

Located at the upper end of shaft 104 is a cam follower 114, having a first cam surface 116 and a second, oppositely inclined cam surface 118. The lower end of shaft 104 includes an extension 120 having an upwardly extending detent tooth 122 at the outer end thereof. A spring 125, or other suitable means, biases shaft 104 in an upward direction, as viewed in FIG. 4. When shaft 104 is biased upward, in the position shown in FIG. 4, tooth 122 engages one of the V-grooves 102 or control plate 44 and prevents lateral movement of the control plate, and elevator mechanism 22 is locked in position. As control plate 44 moves laterally, tooth 122 engages the V-groove immediately adjacent thereto. Thus, the elevator mechanism is capable of being locked in any number of positions, each position corresponding to a different level of microfiche carrier 20 in cartridge 21.

The operation of detent shaft 104 is controlled by movement of a reciprocally moving extracting mechanism 90 which (FIG. 6) removes and then replaces a selected one of the microfiche 20 in the cartridge 21. This mechanism includes an extractor plate 91 which is somewhat box shaped with oppositely disposed extractor hooks 92 dependent therefrom at the lower leading corners of the box. The bottom of the extractor plate 91 has a pair of wheels 93, 94 which ride back and forth in directions G, H. The wheels rest in and ride upon a U-shaped channel 95 which is fixed on the inside of a reader housing. As the extractor 91 moves in direction G, the hooks 92 enter the cartridge 21 and extract the microfiche carrier which is positioned at the level opposite the hooks. These hooks engage a pair of notches (not shown) formed on each of the opposing front corners of each of the selected microfiche carriers 20. Then the extractor 91 and its integral hook 92 are withdrawn in direction H to thereby pull the selected microfiche 20 from the library file inside the cartridge 21.

Attached near the end of extractor plate 91 and extending outwardly therefrom is a roller cam 124 (FIGS. 4, 5). The cam is positioned to engage surface 116 of cam follower 114 when extractor plate 91 moves in the direction G (FIG. 5). Upon continued movement of plate 91 in direction G, surface 116 rides on cam 124 and detent operating shaft 104 moves downward. When extractor plate 91 is in position to extract a fiche, cam 124 engages surface 118 of cam follower 144, and shaft 104 is held in its downward position due to the slope of surface 118. The interaction between surface 118 of cam follower 114 and cam 124 also urges extractor plate 91 towards the left, as viewed in FIG. 5. Detent tooth 122 becomes disengaged with its corresponding V-groove 102 in control plate 44, and the control plate is unlocked for movement in either direction C or D (FIG. 1). With control plate 44 unlocked, the elevator base plate may be raised or lowered whereby hooks 92 can extract another fiche carrier. The cartridge structure is such that the elevator 26 may move vertically while hooks 92 are travelling through vertically aligned notches in the microfiche 20, thus positioning the hooks opposite a selected microfiche.

In an alternate form of the invention, roller can 124 may be eliminated, and wheel 93 located near the left edge (as viewed in FIG. 5) of extractor 91. Wheel 93 would then exert a downward force on detent operating shaft 104 when extractor plate 91 is in its leftmost position in the same manner as described above with relation to roller cam 124.

An advantage of latching the elevator mechanism in the control plate 44 instead of in the elevator of cartridge is that the cam surface in slot 60 of the control plate can provide a mechanical ratio (typically 2.5:1) between elevator motion and control plate motion. Thus, errors in producing the V-grooves 102 for latching are reduced by this ratio in regards to the elevator positioning. For example, 0.005 error in the control plate results in a 0.002 error in elevator position.

From the foregoing, it should be apparent that the elevator mechanism provides for precise positioning of the selected microfiche opposite the extractor hooks 92. Thereafter, the selected microfiche may be extracted, but the elevator is interlocked and cannot be raised or lowered. After the microfiche is returned to its proper location inside the cartridge, the interlock is removed and the elevator is again free so that another microfiche may be selected. Or, if the elevator is lowered to the bottom of its travel, the cartridge may be removed.

Those who are skilled in the art will readily perceive how various modifications may be made without departing from the scope and the spirit of the invention. Therefore, the appended claims are to be construed to cover all equivalent structures.

We claim:
1. A system for selecting one of a plurality of microfiche stored in a library file contained inside a cartridge;
said plurality of microfiche being suspended in a spaced parallel relationship within said cartridge;
a housing;
elevator means disposed in said housing to receive and support said cartridge with said microfiche disposed therein;
said elevator means being selectively movable between a normal position and any of a plurality of off-normal positions for moving said file to a selected loading station at any of said off-normal positions;
reciprocally movable microfiche extractor means having hooks positioned in said housing adjacent said cartridge, said extractor means being movable between two extremities, one of said extremities being a position wherein with movement out of and into said position said extractor means hooks and removes a microfiche from said cartridge and returns said microfiche into said cartridge respectively;
control plate means operatively connected to said elevator means for moving said elevator between said normal position and any of said off-normal positions adjacent said extractor means;
said control plate means movable in a direction perpendicular to the direction of movement of said elevator means;
selective elevator locking means operatively connected between said control plate and said extractor means for normally engaging said control plate and thereby locking said elevator while a microfiche is removed from said cartridge;
said extracting means engaging said locking means at the extracting extremity for unlocking said elevator;
said locking means relocking said elevator responsive to movement of said extracting means away from the extremity of said extracting means motion and thereafter continuously maintaining said elevator in said normally locked condition throughout an entire period beginning when a microfiche begins to move off its normal position in said cartridge, continuing for the entire time while said microfiche is out of said cartridge, and ending when said microfiche returns to is normal position in said cartridge.

2. The system of claim 1 wherein said selective elevator locking means includes:

latch means mounted for reciprocal motion relative to said housing having a detent tooth on one end thereof;

notch means disposed in said control plate for receiving said detent tooth and locking said control plate when said latch means is in a first position;

means biasing said latch means towards said first position; and cam means connected to said extractor plate for urging said latch means towards a second position whereby said detent tooth is withdrawn from said notch means and said control plate is unlocked.

3. The system of claim 2 wherein:

said extractor means is movable from a first mode adjacent said cartridge for extracting said microfiche from said cartridge to a second mode whereby said microfiche has been extracted from said cartridge;

said cam means urging said latch means towards said second position when said extractor means is moved to said first mode.

4. The system of claim 3 wherein:

said cam means comprises a roller cam surface connected to said extractor means;

said latch means including a first cam follower surface for engaging said cam means when said extractor means is moved to said first mode.

5. The system of claim 4 wherein:

said latch means further includes a second cam follower surface adjacent said first cam follower surface for engaging said cam means and locking said latch means in said second position when said extractor means is in said first mode.

6. The system of claim 5 wherein:

said second cam follower surface urges said extractor means towards said first move when said second cam follower surface is engaged by said cam means.

7. The system of claim 2 wherein said notch means comprises a plurality of V-groove notches disposed along the lower edge of said control plate.

* * * * *